US010384789B2

(12) United States Patent
Ruegsegger et al.

(10) Patent No.: US 10,384,789 B2
(45) Date of Patent: Aug. 20, 2019

(54) ASPIRATOR ASSEMBLY WITH INTEGRATED PRESSURE RELIEF VALVE

(71) Applicant: Goodrich Corporation, Charlotte, NC (US)

(72) Inventors: Nick Ruegsegger, Peoria, AZ (US); Steven Evans, Sun City, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 346 days.

(21) Appl. No.: 15/356,822

(22) Filed: Nov. 21, 2016

(65) Prior Publication Data
US 2018/0141669 A1  May 24, 2018

(51) Int. Cl.
*B64D 25/14* (2006.01)
*B60C 29/00* (2006.01)
*F04F 5/16* (2006.01)

(52) U.S. Cl.
CPC .............. *B64D 25/14* (2013.01); *B63C 9/24* (2013.01); *F04F 5/16* (2013.01)

(58) Field of Classification Search
CPC ......... B64D 25/14; B64D 25/08; F04F 5/463; F04F 5/466; F04F 5/16; F04F 5/18; B63C 9/24
See application file for complete search history.

(56) References Cited

U.S. PATENT DOCUMENTS

| | | | | |
|---|---|---|---|---|
| 307,967 A | * | 11/1884 | Macfarlane | F04F 5/466 417/163 |
| 2,627,998 A | * | 2/1953 | Musser | B63C 9/24 222/5 |
| 2,772,829 A | | 12/1956 | Crawford et al. | |
| 2,842,159 A | * | 7/1958 | Sprague | A62B 9/00 137/114 |
| 3,598,504 A | * | 8/1971 | Siravo | F04F 5/48 417/184 |
| 3,640,645 A | | 2/1972 | Orsythe | |
| 3,684,404 A | * | 8/1972 | Galbraith | F04F 5/466 417/179 |
| RE27,860 E | * | 1/1974 | Day | B64D 25/14 244/905 |
| 3,910,532 A | * | 10/1975 | Fischer | B64D 25/14 182/48 |
| 4,368,009 A | * | 1/1983 | Heimovics, Jr. | B61B 12/005 417/179 |

(Continued)

FOREIGN PATENT DOCUMENTS

| | | |
|---|---|---|
| EP | 0039465 | 11/1981 |
| EP | 0046275 | 2/1982 |
| WO | 8302981 | 9/1983 |

OTHER PUBLICATIONS

European Patent Office, European Search Report dated Mar. 9, 2018 in Application No. 17202683.3-1010.

*Primary Examiner* — Brian M O'Hara
(74) *Attorney, Agent, or Firm* — Snell & Wilmer, L.L.P.

(57) ABSTRACT

An aspirator assembly for an inflatable device may have an inner housing disposed about an axis with an outlet formed through the inner housing. An outer housing may also be disposed about the axis with a surface of the outer housing covering the outlet. The outer housing may be translatable relative to the inner housing to expose the outlet in response to a gas pressure within the aspirator assembly being above a threshold.

20 Claims, 6 Drawing Sheets

(56) References Cited

U.S. PATENT DOCUMENTS 4,566,862 A * 1/1986 Halavais .................. F04F 5/48
                                                                  417/174
6,240,951 B1 6/2001 Yori \* cited by examiner

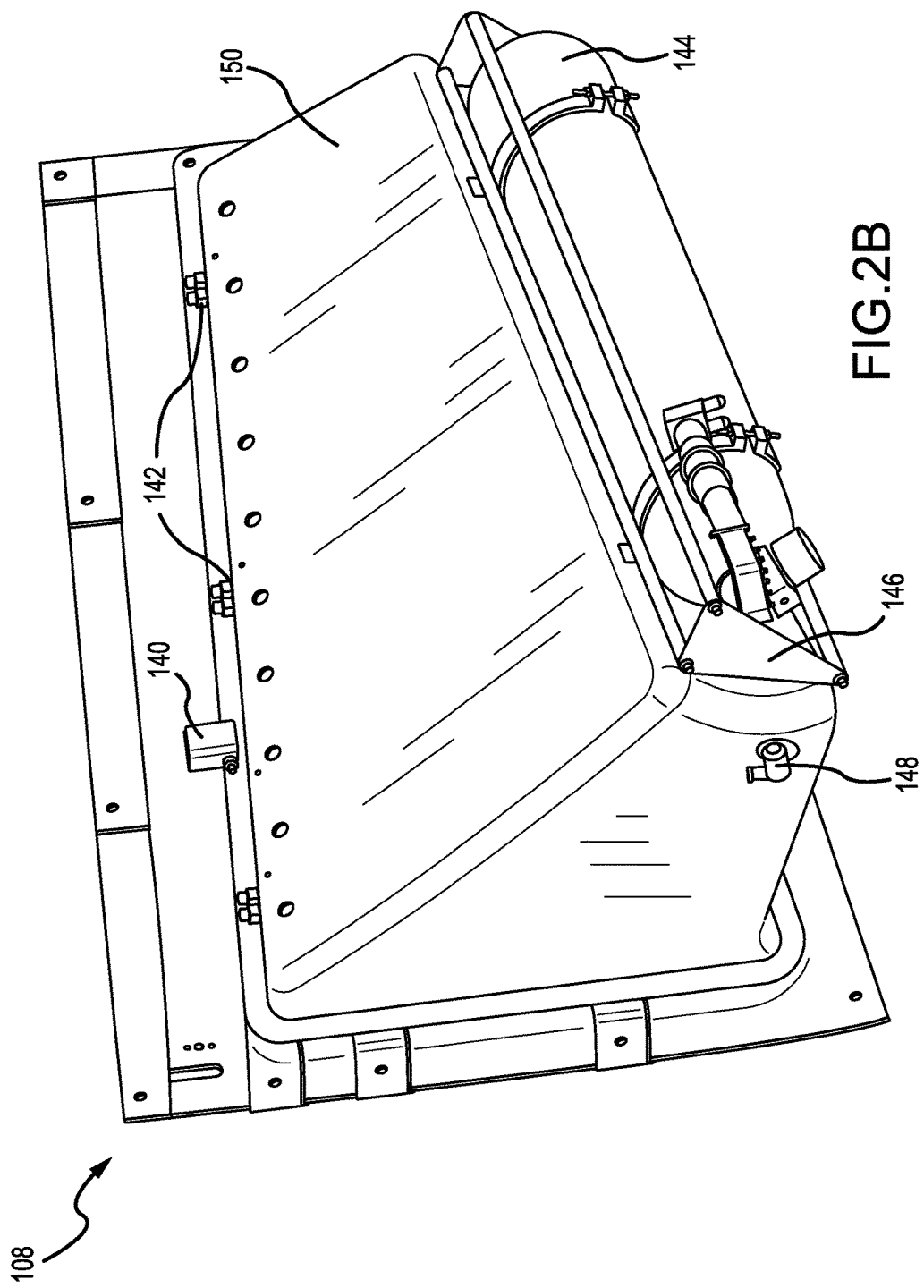

ASPIRATOR ASSEMBLY WITH INTEGRATED PRESSURE RELIEF VALVE

FIELD

The disclosure relates generally to aspirators for inflatable devices having an integrated relief valves.

BACKGROUND

Typical evacuation slides comprise both an aspirator for filling the slide and a pressure relief valve (PRV) for exhausting excess gas pressure as part of their inflation systems. An aspirator usually allows the inflatable to intake gas for inflation and to retain gas after inflation. A PRV typically provides an outlet for gas in the event pressure inside the inflatable exceeds a predetermined threshold.

In an aircraft, available volume and weight capacity come at a premium. A common problem with evacuation systems is pack density. Pack density refers to the amount of packed slide and components occupied in response to the system being packed into the space available. Pack weight is an additional consideration. The aspirator and PRV are typically separate components. As such, each occupies its own separate share of the overall allowable pack space.

SUMMARY

An aspirator assembly for an inflatable device is provided. The aspirator assembly may have an inner housing disposed about an axis with an outlet formed through the inner housing. An outer housing may also be disposed about the axis with a surface of the outer housing covering the outlet. The outer housing may be configured to expose the outlet in response to a gas pressure within the aspirator assembly being above a threshold.

In various embodiments, a flap may be coupled to the inner housing and configured to open and close in response to the gas pressure within the aspirator assembly. The outer housing may be fixed relative to the inflatable device. The inner housing may be configured to translate axially relative to the outer housing and the inflatable device in response to the gas pressure within the aspirator assembly. A spring assembly may be configured to bias the inner housing and the outer housing into a closed position. A face seal may be disposed between the inner housing and the outer housing. The spring assembly may include a pin extending through a wall of the inner housing, an end cap coupled to the pin, and a spring retained on the pin between the end cap and the wall of the inner housing. A swing constant of the spring assembly may be selected to urge the inner housing and the outer housing into the closed position in response to the gas pressure within the aspirator assembly dropping below the threshold.

An evacuation slide assembly is also disclosed herein. The evacuation slide assembly may include a slide, and an aspirator assembly. The aspirator assembly may include an outer housing coupled to the slide, and an inner housing having an inlet and an outlet. The outer housing may cover the outlet. The inner housing may translate relative to the outer housing to expose the outlet. A charged tank may be in fluid communication with the inlet of the inner housing.

In various embodiments, the inner housing may translate relative to the outer housing in response to a gas pressure within the aspirator assembly being above a threshold. A flap may be coupled to the inner housing and may open in response to a pressurized gas from the charged tank. A spring assembly may bias the inner housing and the outer housing into a closed position. A face seal may be disposed between the inner housing and the outer housing. The spring assembly may include a pin extending through a wall of the inner housing, an end cap coupled to the pin, and a spring retained on the pin between the end cap and the wall of the inner housing. A spring constant of the spring may be selected to urge the inner housing and the outer housing into the closed position in response to a gas pressure within the aspirator assembly dropping below a threshold.

An aircraft having an evacuation slide assembly is also provided. The aircraft may include a housing, a panel covering the housing, a slide retained within the housing, and an aspirator assembly coupled to the slide. The aspirator assembly may further include an outer housing coupled to the slide, and an inner housing configured to translate axially relative to the outer housing to expose an outlet. A charged tank may be in fluid communication with the inlet of the inner housing.

In various embodiments, the inner housing may translate relative to the outer housing in response to a gas pressure within the aspirator assembly being above a threshold. A flap may be coupled to the inner housing and configured to open in response to a pressurized gas from the charged tank. A spring assembly configured to bias the inner housing and the outer housing into a closed position. The spring assembly may include a pin extending through a wall of the inner housing, an end cap coupled to the pin, and a spring retained on the pin between the end cap and the wall of the inner housing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 2B illustrates an emergency evacuation assembly with a charged tank and a pressure relief valve, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Emergency evacuation slides may be released from packing and inflated using an aspirator and pressure relief valve (PRV). Emergency slides may be inflated using a charged pneumatic system coupled to the aspirator. The pneumatic system that inflates the slide may on occasion fill the inflatable with excess gas such that the gas pressure within the inflatable exceeds a desired level. The PRV relieves excess pressure beyond a predetermined threshold. The PRV and aspirator of the present disclosure are integrated into a single component to conserve volume and weight, as described below.

Figure 1:
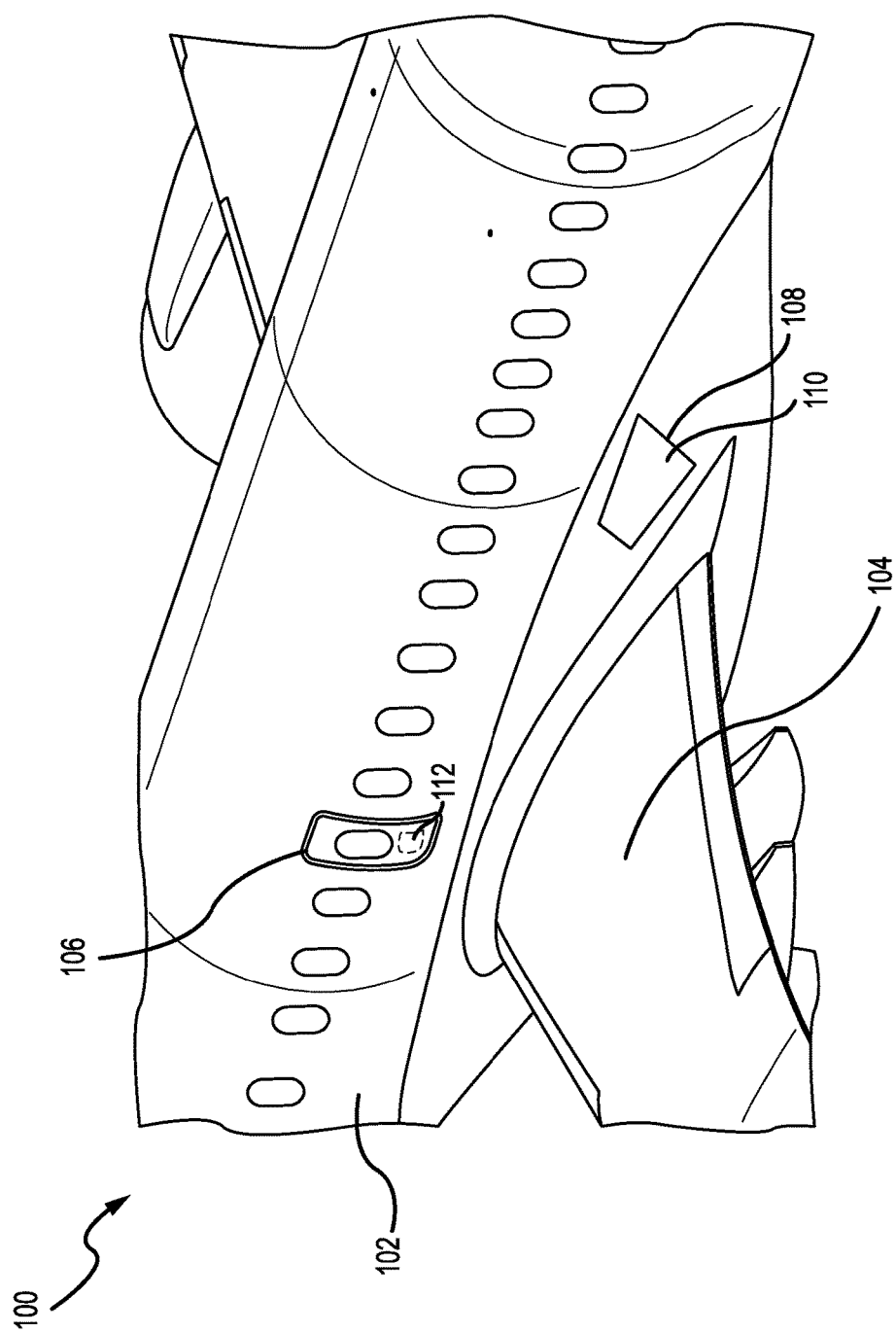
FIG. 1 illustrates an exemplary aircraft evacuation system, in accordance with various embodiments.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation slide assembly 108 may be disposed aft of emergency exit door 106. Panel 110 may cover evacuation slide assembly 108 when installed on aircraft 100. Evacuation slide assembly 108 may jettison panel 110 and deploy an inflatable slide in response to emergency exit door 106 opening. An evacuation slide assembly may also be coupled to door 106 in an internal compartment 112, illustrated by ghosted lines. Although various evacuation slide assemblies may be located at various locations on an aircraft, the operation of the PRV and aspirators of the present disclosure is the same or similar at each location.

Figure 2A:
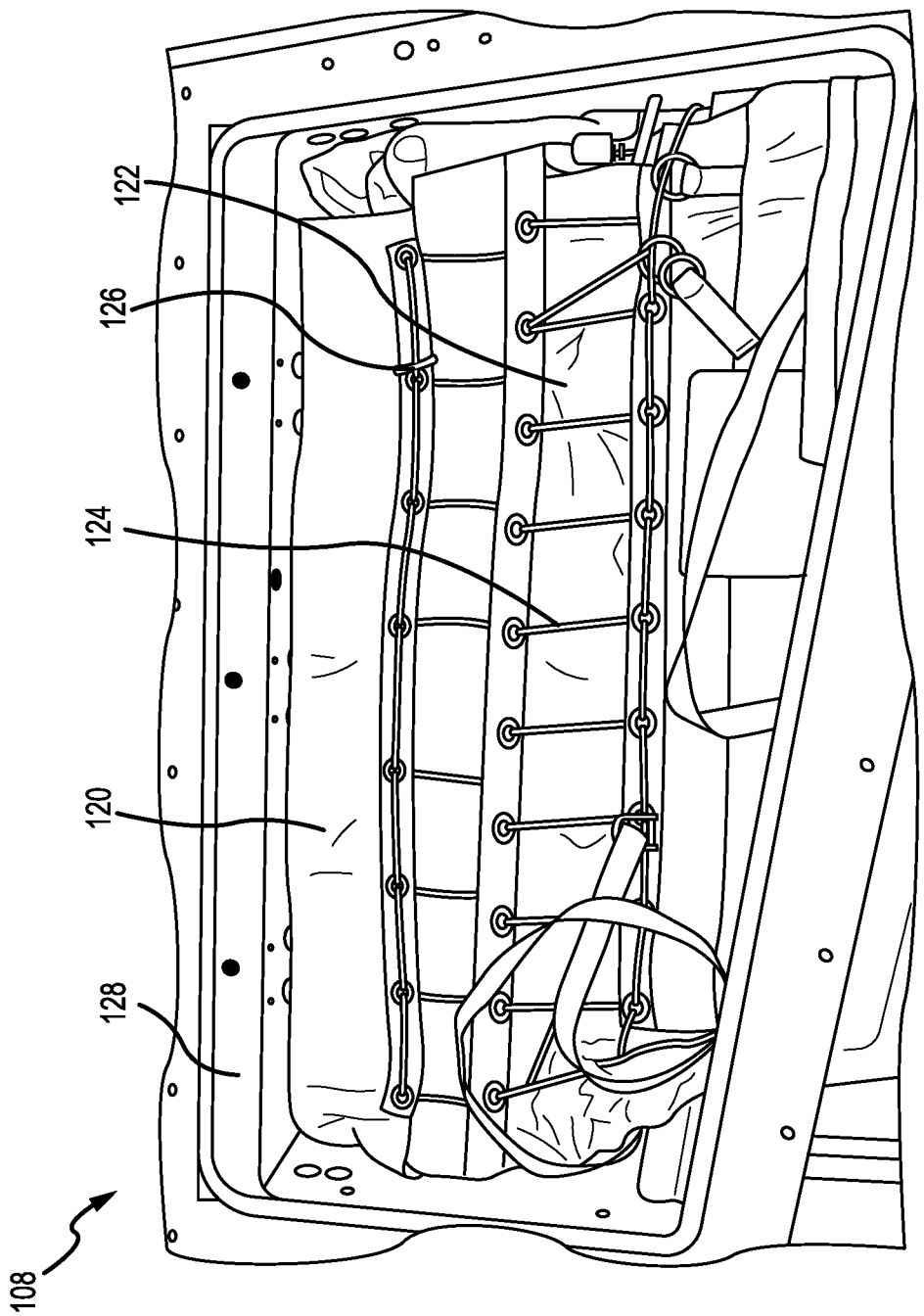
FIG. 2A illustrates an emergency evacuation assembly including a slide in a fabric pack with a laced enclosure and release pin, in accordance with various embodiments.

With reference to FIG. 2A, evacuation slide assembly 108 is shown as viewed from an outboard side with panel 110 (of FIG. 1) removed from panel interface 128, in accordance with various embodiments. Evacuation slide assembly 108 may comprise soft cover 120 containing slide 122. Soft cover 120 may have lace 124 to enclose soft cover 120 and retain slide 122. Lace 124 may be in a daisy chain or speed lacing configuration with pin 126 closing the daisy chain or speed lacing. Pin 126 may be slideably coupled to lace 124 such that lace 124 may unlace in response to movement of pin 126. In that regard, pin 126 may prevent lace 124 from unfurling and releasing slide 122 while pin is in place. An actuator may be positioned to pull pin 126 and release slide 122 from soft cover 120. Pin 126 may be disposed in a retaining structure and the translated away from the retaining structure to release lace 124. Although a pin and actuator release mechanism is shown, any suitable release mechanism may be used in evacuation slide assembly 108.

With reference to FIG. 2B, evacuation slide assembly 108 is shown as viewed from an inboard direction, in accordance with various embodiments. Evacuation slide assembly 108 may include housing 150 (also referred to as a packboard) with actuator 140 coupled to housing 150. Ball locks 142 may be coupled to housing 150 as well and configured to release panel 110 (of FIG. 1). Charged tank 144 may be mounted to the back of housing 150. Charged tank 144 may provide pressurized gas to inflate slide 122 (of FIG. 2A) to inflate slide 122 be delivering the pressurized gas through an aspirator (illustrated below). Charged tank 144 may be pneumatically coupled to components of evacuation slide assembly 108 through inlet 148.

Figure 3:
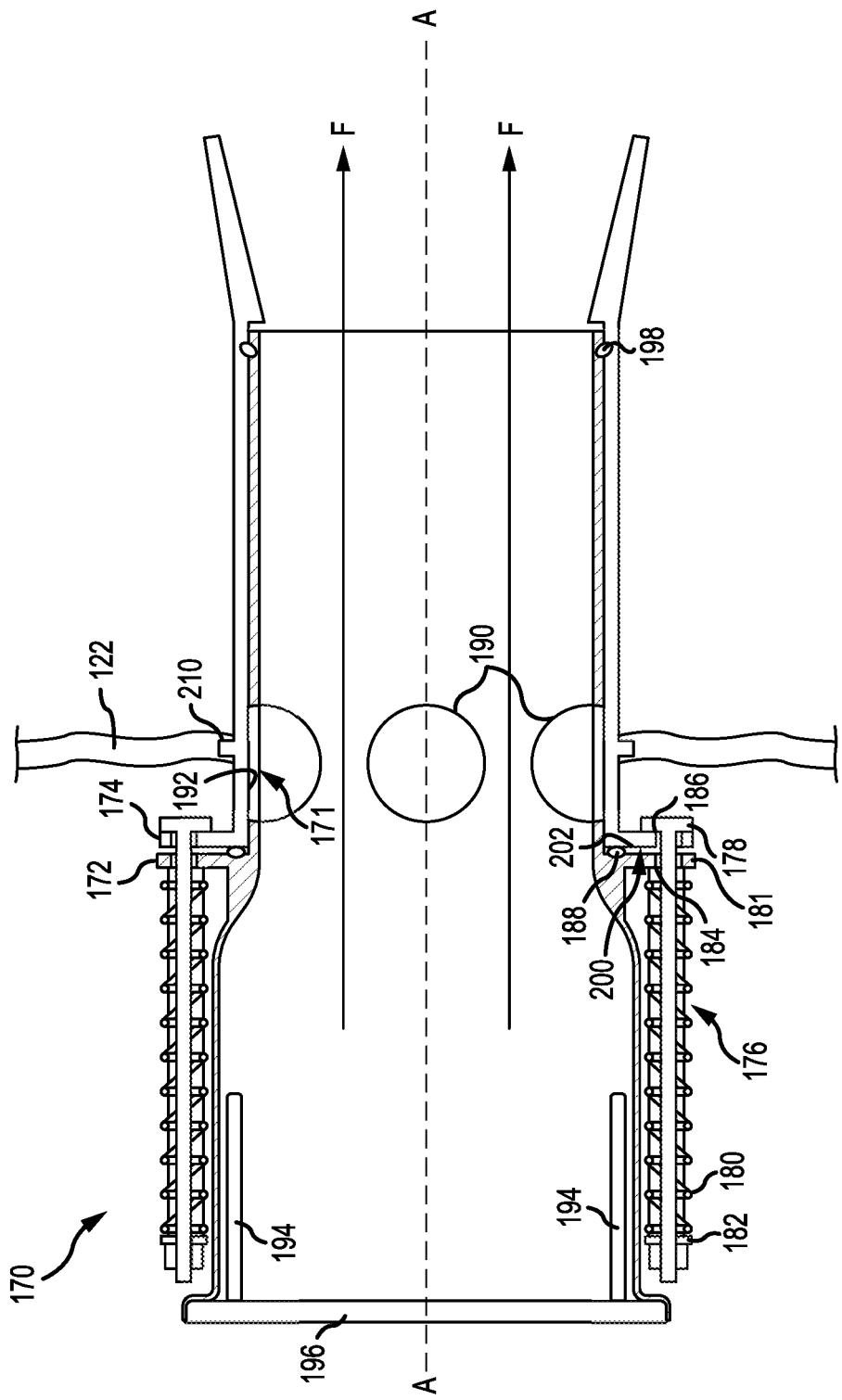
FIG. 3 illustrates an aspirator having an integrated pressure relief valve for an inflatable device with the pressure relief valve in a closed state, in accordance with various embodiments.

Referring now to FIG. 3, an aspirator assembly 170 including a PRV 171 integrated into the aspirator assembly 170 is shown, in accordance with various embodiments. Aspirator assembly may include aspirator inlet 196 in fluid communication with charged tank 144 through inlet 148, both of FIG. 1. Aspirator assembly 170 may comprise an inner housing 172 and an outer housing 174. Inner housing may 172 may be coupled to or formed integrally with inlet 196. Flaps 194 may also be coupled to inner housing 172. Flaps 194 may be opened by flow F of pressurized gas supplied by charged tank 144 (of FIG. 2B). In the open configuration, flaps 194 may allow gas to enter slide 122 (of FIG. 2A). Although the terms inner housing 172 and outer housing 174 are used, the relative nested position of the inner housing 172 and outer housing 174 may be reversed and aspirator assembly 17 would still function as desired.

In various embodiments, inner housing 172 and/or outer housing 174 may be made from various materials. Suitable materials may include metals, composites, plastics, molded materials, machined materials, or other suitable materials. For various embodiments, molded thermoplastics may provide suitable strength and light weight for a one-time use aspirator assembly 170. In various embodiments, where aspirator assembly 170 is used multiple times, stronger materials such as metals and/or composites may be used. Inner housing 172 and outer housing 174 are depicted as annular structures; however, any inner housing 172 and/or outer housing 174 may be formed with any suitable cross-sectional geometry. Suitable geometries may include polygonal, oval, circular, irregular, or other suitable shapes. For example, a square geometry may be used to provide relative anti-rotation between inner housing 172 and outer housing 174.

In various embodiments, outer housing 174 may be coupled to slide 122 (of FIG. 1) to retain aspirator assembly 170 in place in slide 122. For example, notch 210 may be a mounting notch to mate with slide 122. Inner housing 172 may thus be free to translate along axis A relative to outer housing 174 and slide 122. Inner housing 172 and outer housing 174 may be coupled with a spring assembly 176 configured to bias PRV 171 of aspirator assembly 170 into a closed configuration.

In various embodiments, spring assembly 176 may include a pin 178 coupled to outer housing 174. Pin 178 may serve as a guide for spring 180 and may pass through opening 184 in wall 181 and/or opening 186 of outer housing 174. Spring 180 may be retained on pin 178 between end cap 182 of pin 178 and wall 181 of inner housing 172. Spring 180 may be selected to result in actuation of inner housing 172 relative to outer housing 174 in the x direction in response to a predetermined force threshold. The spring constant of spring 180 may be selected according to Hooke's law. In that regard, Hooke's law may be used to select and/or tune spring 180 to apply the desired amount of force biasing PRV 171 into the closed position. Hooke's law is represented by equations $E_1$ and $E_2$ below, where F is force, k is the spring constant, and X is the displacement distance:

$$F = kX; \quad (E_1)$$

or $$k = F/X \quad (E_2)$$

The spring constant k may be selected by dividing the desired force by the desired displacement in response to that force. For example, if the desired gas pressure within the inflatable is 100 psi (6.9 Bar), and the flaps 194 have a 1 inch (2.54 cm) radius and thus 3.14 square inch (20.3 cm$^2$) area, and the PRV 171 opens in response to inner housing 172 translating 1 inch relative to outer housing 174, then the spring constant k=100 psi*3.14 in$^2$/1 in=314 lb/inch (54,989 N/m). In systems with multiple springs (as illustrated in FIG. 3), the spring constant may be a total spring constant across all springs. Continuing the example above, the spring constant for the system, calculated to be 314 lb/in, divided across two springs of equal spring constant k would make each spring have an individual spring constant of 157 lb/in (27,494 N/m). Spring 180 may be coupled between inner housing 172 and outer housing 174 in any manner that biases PRV 171 to a closed position.

In various embodiments, PRV 171 is in a closed position when outlets 190 formed through inner housing 172 are covered by surface 192 of outer housing 174. In that regard, the sealing mechanism of PRV 171 includes outlets 190 of inner housing 172, outer housing 174, seal 188, and seal 198. Seal 188 and seal 198 may be O-ring seals, c-seals, face seals, or any seal suitable for sealing gaps between inner housing 172 and outer housing 174. For example, seal 188 may be a face seal coupled to surface 200 of inner housing 172 and configured to seal a gap between surface 200 of inner housing 172 and surface 202 of outer housing 174 in response to PRY 171 being in a closed position.

Figure 4:
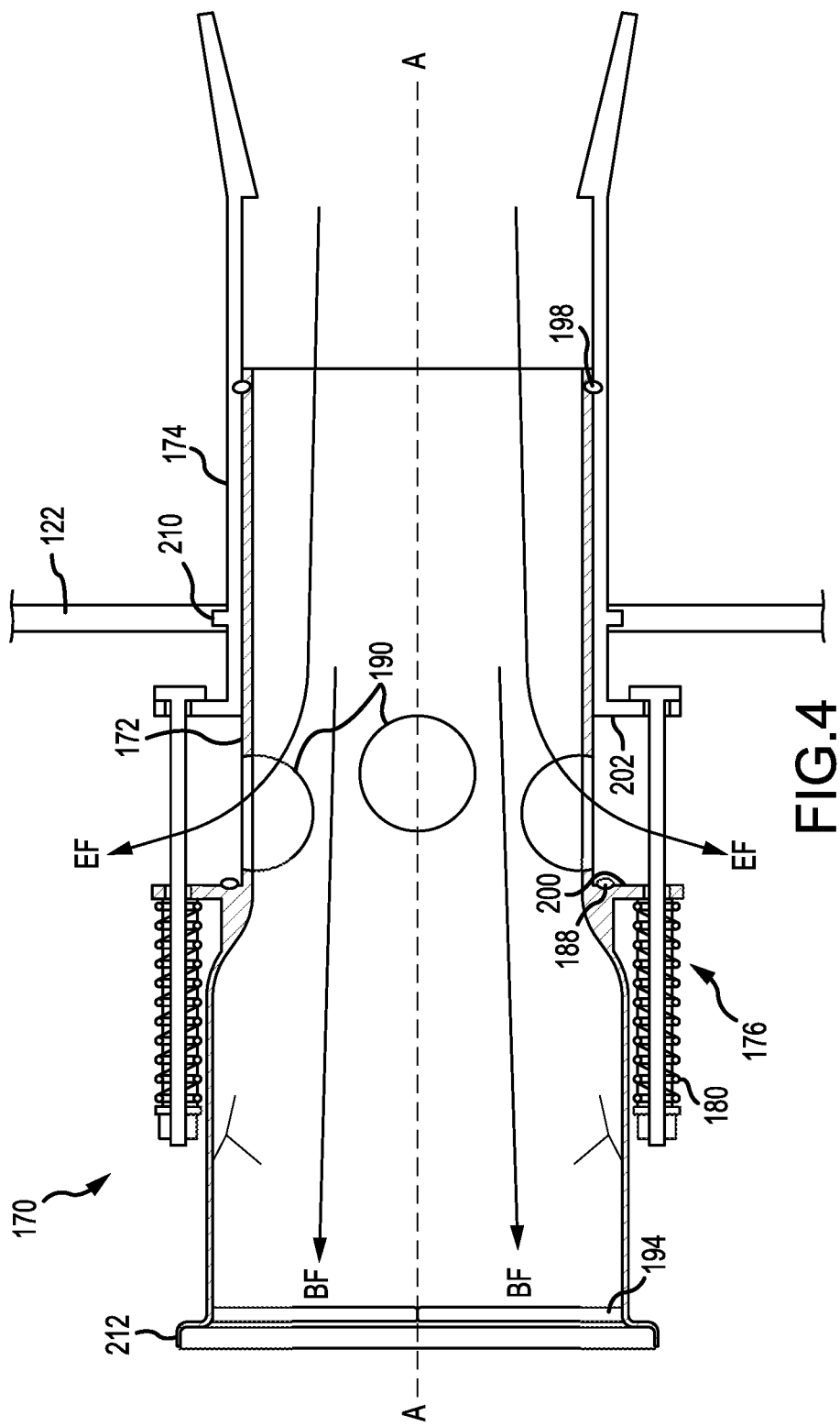
FIG. 4 illustrates an aspirator having an integrated pressure relief valve for an inflatable device with the pressure relief valve in an open state, in accordance with various embodiments.

Referring now to FIG. 4, aspirator assembly 170 is shown with PRV 171 in an open state, in accordance with various embodiments. Back flow BF may press against flaps 194 to close aspirator assembly 170 in response to the pressure in slide 122 (of FIG. 1) exceeding the pressure provided by charged tank 144. The pressure level in slide 122 may correspond to a pressure applied by backflow BF against flaps 194. The pressure applied by backflow BF to closed end 212 of inner housing 172 may urge inner housing 172 to translate along axis A relative to outer housing 174. Surface 200 of inner housing 172 and seal 188 may thus translate linearly along axis A and away from surface 202 of outer housing 174. Seal 198 may be retained between inner housing 172 and outer housing 174 by, for example, a circumferential groove formed in inner housing 172.

In various embodiments, the linear translation of inner housing 172 may apply a compressive force to spring 180 of spring assembly 176. In that regard, spring 180 may tend to press inner housing 172 towards outer housing 174 with greater force as spring 180 becomes more compressed. Exhaust flow EF of pressurized gas may pass through outlets 190 of inner housing 172 into the ambient environment. In response to exhaust flow EF exiting through outlets 190, the pressure retained within slide 122 may decrease. In response to the pressure retained within slide decreasing, spring 180 may tend to expand and urge inner housing 172 back into a closed position with outer housing 174 covering outlets 190. The spring constant k of spring 180 may thus be selected as described above to close PRV 171 in response to the pressure within slide 122 decreasing to a predetermined threshold value.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

Figure 5:
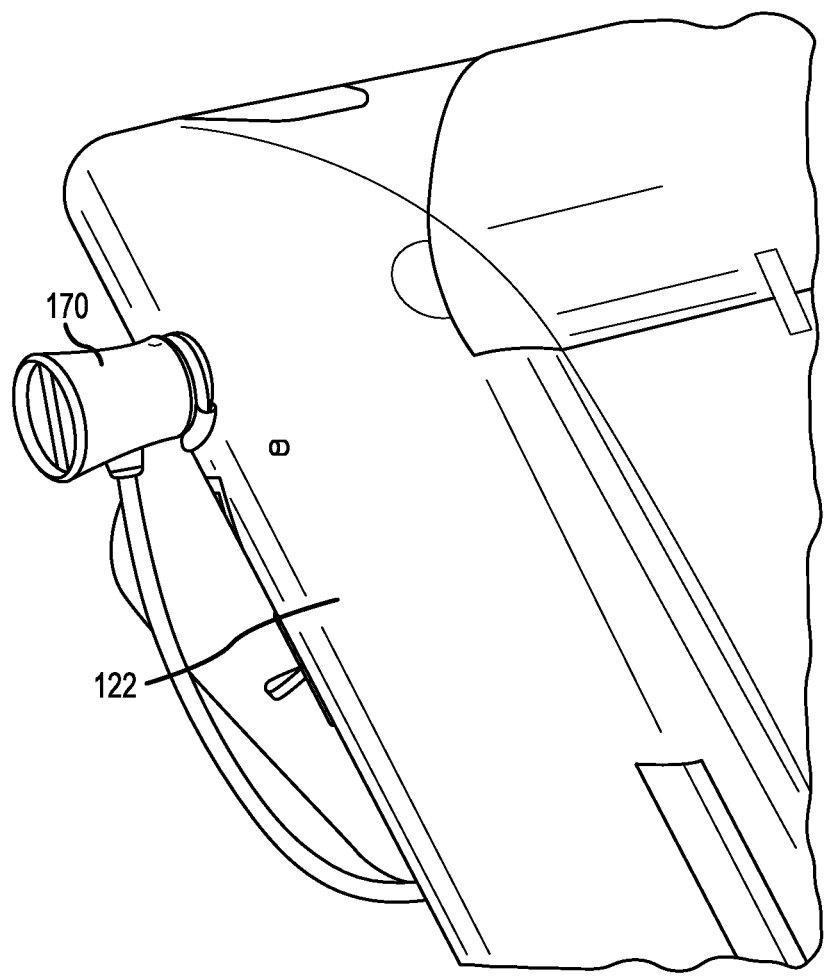
FIG. 5 illustrates an inflated slide with an aspirator having an integrated pressure relief valve, in accordance with various embodiments.

With reference to FIG. 5, an example of aspirator 170 in slide 122 after inflation is shown according to various embodiments. Although the present aspirator assembly 170 is disclosed for use with a slide, aspirator assembly 170 may also be effective with other inflatables such as rafts, airbags, etc. The PRV is set to a predetermined pressure by using a valve and a spring, if the pressure inside the inflatable is higher than the spring the valve opens and bleeds off excess pressure. The present aspirator assembly 170 incorporates the PRV into the aspirator body to reduce installation volume and reduce weight.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator and pressure relief valve assembly for an inflatable device, comprising:
    an inner housing disposed about an axis and having an outlet formed through a radially outer surface of the inner housing; and
    an outer housing translatable along the radially outer surface of the inner housing and disposed about the axis with a surface of the outer housing covering the outlet, wherein the outer housing is configured to translate relative to the inner housing to expose the outlet to an ambient environment in response to a gas pressure within the aspirator and pressure relief valve assembly being above a threshold.

2. The aspirator and pressure relief valve assembly of claim 1, further comprising a flap coupled to the inner housing and configured to open and close in response to the gas pressure within the aspirator and pressure relief valve assembly.

3. The aspirator and pressure relief valve assembly of claim 1, wherein the outer housing is fixed relative to the inflatable device.

4. The aspirator and pressure relief valve assembly of claim 3, wherein the inner housing is configured to translate axially relative to the outer housing and the inflatable device in response to the gas pressure within the aspirator and pressure relief valve assembly.

5. The aspirator and pressure relief valve assembly of claim 1, further comprising a spring assembly configured to bias the inner housing and the outer housing into a closed position.

6. The aspirator and pressure relief valve assembly of claim 5, further comprising a face seal disposed between the inner housing and the outer housing.

7. The aspirator and pressure relief valve assembly of claim 5, wherein the spring assembly further comprises:
    a pin extending through a wall of the inner housing;
    an end cap coupled to the pin; and
    a spring retained on the pin between the end cap and the wall of the inner housing.

8. The aspirator and pressure relief valve assembly of claim 5, wherein a spring constant of the spring assembly is selected to urge the inner housing and the outer housing into the closed position in response to the gas pressure within the aspirator and pressure relief valve assembly dropping below the threshold.

9. An evacuation slide assembly, comprising:
    a slide;
    an aspirator and pressure relief valve assembly comprising:
        an outer housing coupled to the slide;
        an inner housing slideably engaged with the outer housing and an outlet formed through a radially outer surface of the inner housing, the outlet covered by the outer housing in a closed position, wherein the inner housing is configured to translate along the outer housing to expose the outlet to an ambient environment; and
    a charged tank in fluid communication with an inlet of the inner housing.

10. The evacuation slide assembly of claim 9, wherein the inner housing is configured to translate relative to the outer housing in response to a gas pressure within the aspirator and pressure relief valve assembly being above a threshold.

11. The evacuation slide assembly of claim 9, further comprising a flap coupled to the inner housing and configured to open in response to a pressurized gas from the charged tank.

12. The evacuation slide assembly of claim 9, further comprising a spring assembly configured to bias the inner housing and the outer housing into a closed position.

13. The evacuation slide assembly of claim 12, further comprising a face seal disposed between the inner housing and the outer housing.

14. The evacuation slide assembly of claim 12, wherein the spring assembly further comprises:
    a pin extending through a wall of the inner housing;
    an end cap coupled to the pin; and
    a spring retained on the pin between the end cap and the wall of the inner housing.

15. The evacuation slide assembly of claim 14, wherein a spring constant of the spring is selected to urge the inner housing and the outer housing into the closed position in response to a gas pressure within the aspirator and pressure relief valve assembly dropping below a threshold.

16. An aircraft having an evacuation slide assembly comprising:
    a housing;
    a panel covering the housing;
    a slide retained within the housing;
    an aspirator and pressure relief valve assembly coupled to the slide and comprising:
        an outer housing coupled to the slide;
        an inner housing slideably coupled to the outer housing and having an outlet formed through a radially outer surface of the inner housing, the outlet covered by the outer housing in a closed position, wherein the inner housing is configured to translate along the outer housing to expose the outlet to an ambient environment; and
    a charged tank in fluid communication with an inlet of the inner housing.

17. The aircraft having an evacuation slide assembly of claim 16, wherein the inner housing is configured to translate relative to the outer housing in response to a gas pressure within the aspirator and pressure relief valve assembly being above a threshold.

18. The aircraft having an evacuation slide assembly of claim 16, further comprising a flap coupled to the inner housing and configured to open in response to a pressurized gas from the charged tank.

19. The aircraft having an evacuation slide assembly of claim 16, further comprising a spring assembly configured to bias the inner housing and the outer housing into the closed position.

20. The aircraft having an evacuation slide assembly of claim 19, wherein the spring assembly further comprises:
    a pin extending through a wall of the inner housing;
    an end cap coupled to the pin; and
    a spring retained on the pin between the end cap and the wall of the inner housing.

* * * * *